Jan. 21, 1969  J. H. SCHMID  3,422,853
WATER HAMMER ARRESTER WITH CONTROLLED ORIFICE
Filed Oct. 23, 1965  Sheet 1 of 2

INVENTOR.
JOHN H. SCHMID
BY
Charles L. Lovelock,
Attorney

INVENTOR.
JOHN H. SCHMID
BY Charles L. Lovercheck,
Attorney

United States Patent Office 3,422,853
Patented Jan. 21, 1969

3,422,853
WATER HAMMER ARRESTER WITH
CONTROLLED ORIFICE
John H. Schmid, Erie, Pa., assignor to Zurn Industries,
Inc., Erie, Pa., a corporation of Pennsylvania
Filed Oct. 23, 1965, Ser. No. 502,821
U.S. Cl. 138—30                           3 Claims
Int. Cl. F16l 55/04

ABSTRACT OF THE DISCLOSURE

The invention disclosed herein relates to a shock absorber for fluid lines. In its preferred form the shock absorber has a hollow body connected to the fluid line. A resilient compressible member is disposed in the hollow body. An orifice of a predetermined size connects the inside of the hollow body to the fluid line. It has been discovered that by making the orifice of a size equal to approximately one-third of the pipe diameter, that instead of a shock of a large amplitude occurring the shock can be reduced to two low amplitude shock waves.

---

This invention relates to flow control devices and, more particularly, to water hammer arresters.

One of the most disagreeable features of a water piping system is the noises that result from the rapid closing of valves and faucets. This is known as water hammer. When a valve or faucet is closed suddenly and the flow of water thereby stopped, excessive pressure results. A pressure or shock wave is created at the valve, which travels up the pipe until it reaches a larger pipe or tank; it is then reflected and travels back down the pipe to the valve at a lower pressure and continues to cycle in this fashion until the energy of the wave is dissipated. The sudden excessive pressure causes pounding of the valves or faucet discs and vibration of the pipe. A considerable noise results. Sometimes there are no valve parts, and the pipes are anchored rigidly. The noise may not be very pronounced in such instance, and excessive water hammer pressures may be created without the presence of excessive noise. These excessive pressure may cause leaky joints and even break pipes and valves.

Applicant recognizes that the maximum pressure rise is dependent to a large extent directly on the velocity of the water before the valve begins to close, the material from which the pipes are made, and the characteristics of the water hammer arrester if one is used.

Relief devices for reducing water hammer pressures and preventing noise due to water hammer are often made in the form of an air chamber which prevents the water flowing in the pipe from being stopped too suddenly, even though the valve is closed instantly. An air chamber is, of course, not full of air, since the air in it is compressed by the water to some percentage of the total volume of the chamber, depending on the water pressure. Generally, the greater the volume of the chamber occupied by the air, the more effective will be the air chamber in reducing water hammer pressures. For many years, air chambers have been used as one means of controlling shock in piping systems. An air chamber unit usually consists of a capped piece of pipe of the same diameter as the line which it serves and ranging in length from twelve to twenty-four inches. The air chambers are generally placed on supply lines to fixtures or equipment.

The air charge in an air chamber type water hammer arrester can be depleted. During flow cycles, air is drawn from all directions. The trapped air is also diminished by turbulence. The water absorbs the air and as the unit becomes waterlogged, it loses its ability to absorb shock.

To overcome the waterlogging problem, various mechanical type arresters have been designed. Some of these mechanical arresters employ air or gas enclosed in a bellows type of enclosure or equivalent expandable container. The air or gas is sealed in the enclosure and cannot be absorbed by the water.

It has been suggested in the prior art that an orifice between the pipe line and the air chamber or arrester will improve the effectiveness of the arrester. Previous attempts to discover what the size of this orifice should be have not determined the optimum or most advantageous size.

Applicant has discovered that by selecting an orifice of a particular size in the flow path between the water in a pipe and the inside of an arrester that the size of chamber which will give good results in preventing water hammer can be reduced substantially and can be held to a minimum.

It is, accordingly, an object of the invention to provide an improved combination water hammer arrester and orifice.

Another object of the invention is to provide a water hammer arrester which is simple in construction, economical to make, and simple and efficient to use.

Another object of the invention is to provide a water hammer arrester which will function satisfactorily and have a minimum size for a particular application.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
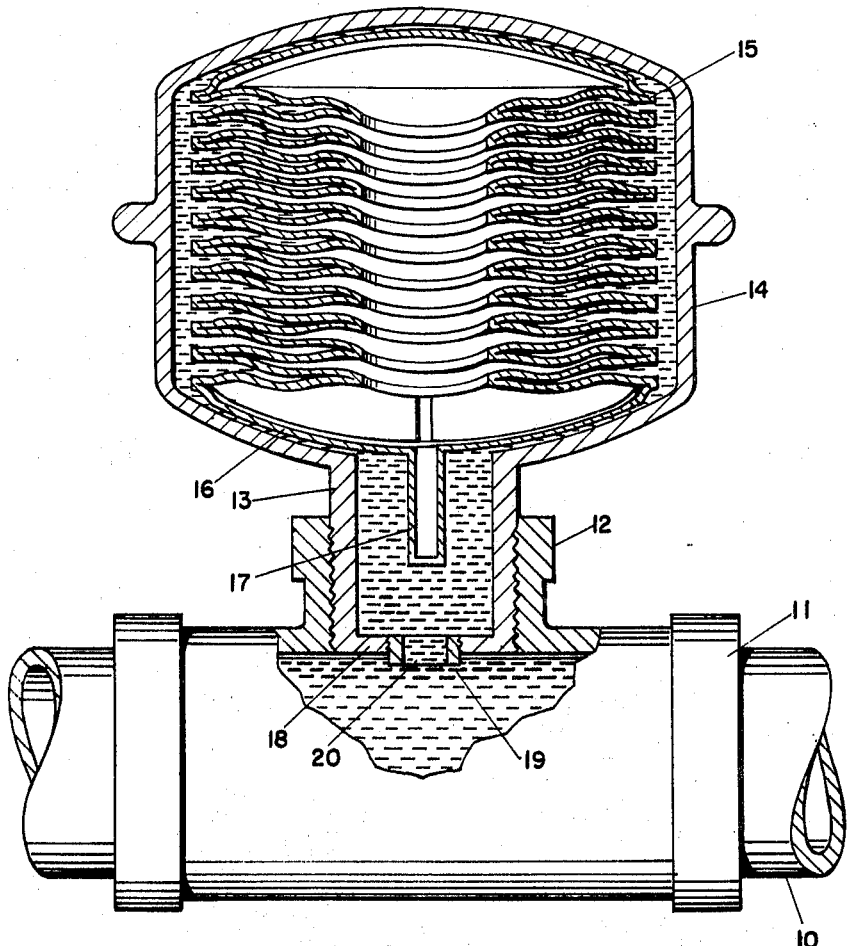
FIG. 1 is a view partly in cross section of a water hammer arrester according to the invention shown attached to a pipe line.

Now with more particular reference to the drawings, a pipe line 10 is shown having a T 11 connected in the line. The T has a branch 12 into which the nipple 13 of the water hammer arrester 14 may be threadably connected. The water hammer arrester has an outside body that encloses the hollow chamber which contains the bellows 15. The bellows 15 may be made, for example, of thin stainless steel, which will not take a permanent set, even if compressed by static line pressures for long periods. The diaphragm may be, for example, so constructed that it will not split or tear under ordinary stresses. The bellows is precharged with air. The air is sealed inside the bellows, and the closed end 16 rests on the inside of the body at the lower end, and the tubular extension 17 extends into the nipple 13.

The nipple 13 has an end 18 into which is threadably inserted an orifice 19, which has an orifice opening 20 therein. The size of the orifice opening 20 will be determined so that it is of a size of such magnitude relative to said hollow body that a surge of pressure in the flow line will result in the pressure in the flow line rising to a first peak value, then decreasing to a value greater than the presurge line pressure in line 10, and then rising to a second peak value substantially equal to the first peak value, and then decreasing substantially to said presurge line pressure.

Figure 2:
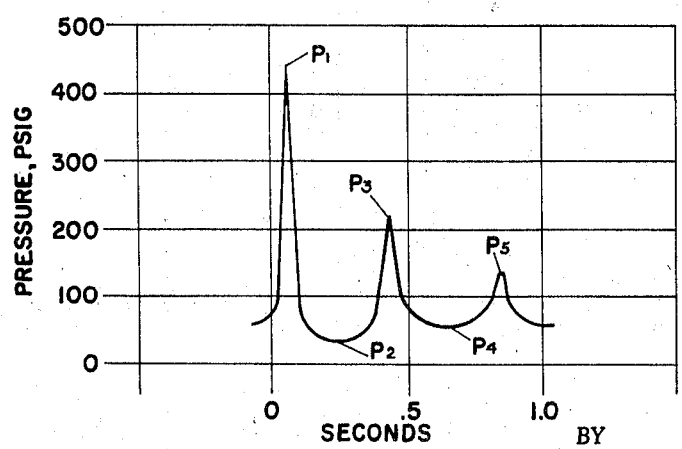
FIG. 2 is a graph showing a pressure time relationship of a water hammer curve when no attention is given to an orifice size.
Figure 3:
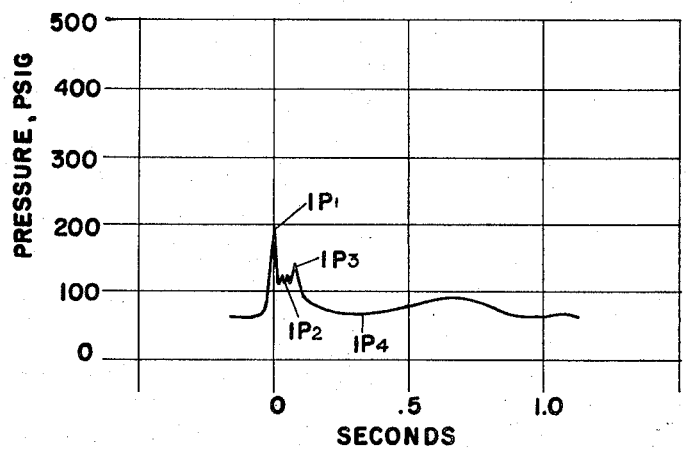
FIG. 3 is a view of a graph similar to FIG. 2, showing the pressure time relationship when an undersize orifice is used.
Figure 4:
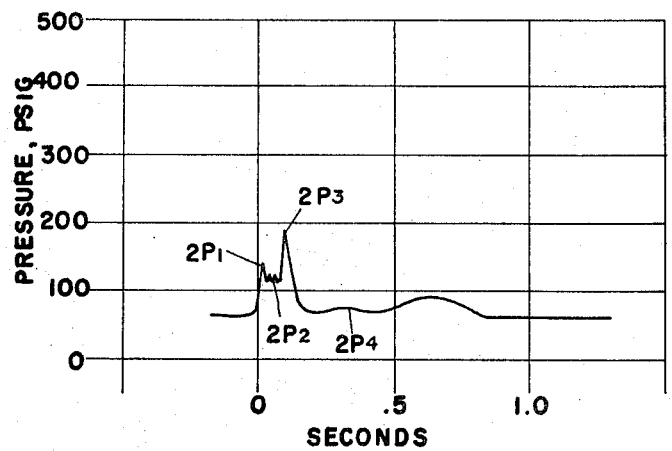
FIG. 4 is a view of a graph showing a pressure time relationship when an oversize orifice is used.

To substantiate the theory set forth herein, applicant has made tests on fluid flow lines of various sizes, and examples of graphs showing the tests are shown in FIGS. 2, 3, 4 and 5. FIG. 2 shows that without any control of the size of the orifice in a water hammer arrester, the pressure during surge goes up to P1, then drops to P2, then rises again to P3, then drops to P4, and rises again to P5, then gradually returns to presurge pressure. It is noted that P1 is substantially greater than P2.

A second test with the orifice smaller than optimum showed that the surge pressure first went up to 1P1, then dropped to 1P2, then rose to 1P3, then dropped to 1P4. It is noted that with the orifice too small, 1P1 was greater than 1P3 but the maximum surge pressure went up to only 200 pounds per square inch at 1P1, as compared with a surge pressure of approximately 450 pounds in FIG. 2, without any attention being paid to the size of the orifice.

An experiment was then run with an orifice that was larger than optimum. In this experiment, the pressure first went up to 2PI, then dropped to 2P2, then rose to 2P3, then dropped to 2P4. Thus, 2P1 was lower than 2P3. It was interesting to note that 2P3 was approximately equal to 1P1. It was also interesting to note that both of these were substantially less than pressure P1.

Figure 5:
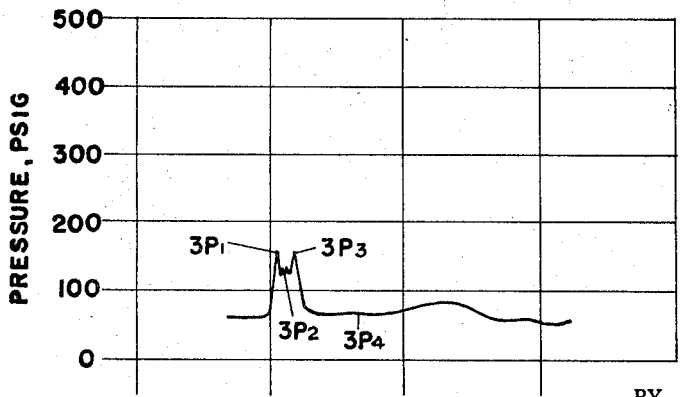
FIG. 5 is a graph similar to FIG. 4, which shows a pressure time relationship when an orifice of the optimum size is used.

An orifice of optimum size was then used, and the experiment repeated. In this experiment, the pressure first rose to 3P1, then dropped to 3P2, then rose to 3P3, then droppd to 3P4. It was noted that with the optimum size orifice, as shown in FIG. 5, the pressure during surge rose to only approximately 150 pounds per square inch, as compared to the pressure of approximately 200 pounds per square inch in FIGS 3 and 4.

Experiments were then run with steel pipes of various sizes over the range of the nominal sizes of pipes normally used in plumbing supplies. It was noted in these experiments that in each case the orifice diameter was approximately one-third the pipe diameter for an optimum surge pressure, as shown in FIG. 5, for the specific test conditions used. The results were shown as follows:

| Nominal pipe diameter (in.) | Orifice size to pipe diameter | Ratio |
|---|---|---|
| ½ | .622/.189 | 3.29 |
| ¾ | .824/.272 | 3.03 |
| 1 | 1.049/.375 | 2.80 |
| 1¼ | 1.380/.470 | 2.94 |
| 1½ | 1.610/.53 | 3.04 |
| 1¾ | 2.067/.625 | 3.31 |

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a fluid flow line and a water hammer arrester,
    said water arrester having a cavity therein containing a gas,
    means connecting said fluid line in fluid flow relation with deformable means forming a closure containing said gas in said cavity,
    said deformable means being deformed by pressure of liquid through said orifice whereby said gas is compressed,
    orifice means in said connection means for said fluid to flow through from said line to said cavity,
    said orifice having a lateral dimension substantially equal to one-third of the lateral inside dimension of said line.

2. The combination recited in claim 1 wherein said deformable means comprises a bellows like structure made of relatively thin material.

3. The combination recited in claim 2 wherein said bellows comprises relatively thin disk-like portions disposed generally perpendicular to the line of flow through said orifice.

References Cited

UNITED STATES PATENTS

| 942,666 | 12/1909 | Romstaedt | 138—26 |
| 2,474,512 | 6/1949 | Bechtold et al. | 138—30 |
| 2,840,111 | 6/1958 | Kerr | 138—26 |
| 3,019,818 | 2/1962 | Everett | 138—30 |
| 3,061,039 | 10/1962 | Peters | 138—30 X |
| 3,159,182 | 12/1964 | Peters | 138—30 |
| 3,169,551 | 2/1965 | Lewis | 138—26 |
| 2,515,394 | 7/1950 | Clarkson | 138—26 |

FOREIGN PATENTS 651,698 10/1937 Germany.

OTHER REFERENCES

Heating and Ventilating vol. 49, issue 7, publication date—July 1952, pp. 83–90, title, "Water Hammer in Pipe Lines," by T. W. Reynolds.

HOUSTON S. BELL, JR., *Primary Examiner.*